No. 879,755.  
PATENTED FEB. 18, 1908.  
A. FISCHER.  
TALKING MACHINE.  
APPLICATION FILED DEC. 29, 1906.
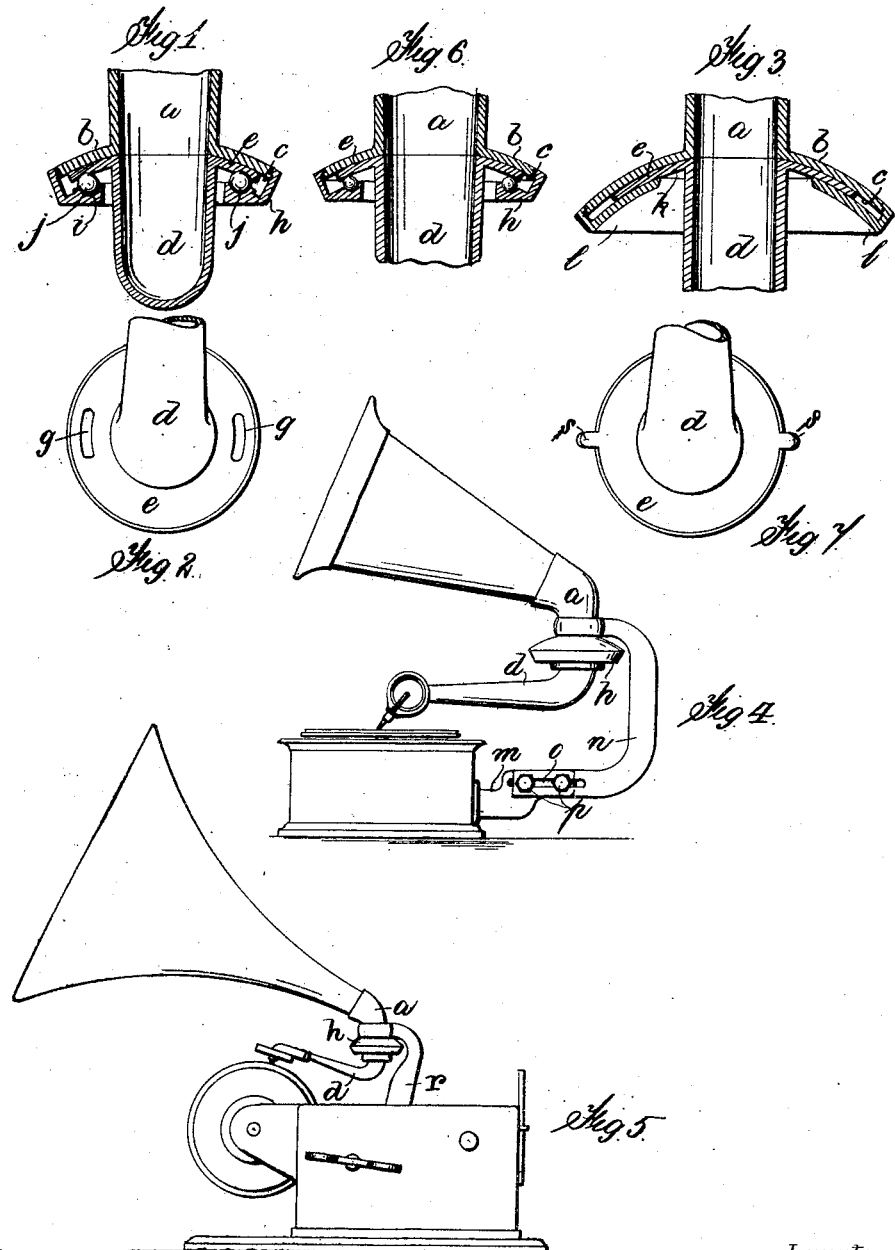
Witnesses.
Inventor:  
Alex Fischer.  
by his Attorneys.

UNITED STATES PATENT OFFICE.

ALEX FISCHER, OF LONDON, ENGLAND.

TALKING-MACHINE.

No. 879,755.   Specification of Letters Patent.   Patented Feb. 18, 1908.

Application filed December 29, 1906. Serial No. 350,014.

*To all whom it may concern:*

Be it known that I, ALEX FISCHER, a subject of the King of England, residing at 18 Hazlitt road, Kensington, in the county of London, England, have invented certain new and useful Improvements in or Relating to Talking-Machines; and I do hereby declare the following to be a full, clear, and exact description of the invention, such as will enable others skilled in the art to which it appertains to make and use the same.

My invention relates to an improvement in talking machines, and the object of my invention is to make a tight, flexible and universal joint between the tone-arm and trumpet.

The existing tone arms of talking machines having only a horizontal and vertical movement on pivots cannot follow the grooves throughout, the movement thus obtained being an angular one along the curves of the grooves it follows that the stylus (needle) can only touch the grooves at certain points.

Joints constructed as hereafter described will allow the movable part of the joint (tone arm) to move in any direction, that is, up and down and to any oblique angle and thus the sound box stylus will travel in the grooves without jerks, not missing any indentations and producing a sustained rich tone of fine quality and shading.

According to this invention, at one end of the two pipes to be connected, I form or fix an annular flange of spherical curvature so that it forms a concave seating. On the other pipe I also form or fix an annular flange of spherical curvature so that it forms a convex flange which fits exactly against the concave seating of the other pipe. The concave seating is of larger spherical section than the convex flange. The under portion of the convex flange is concentric with the top part of the flange and with the faces of the concave seating, the three spherical surfaces having one common center.

Suitable means are provided for keeping the convex and concave surfaces of the flanges in close contact in all positions into which the joint can move. And in order that this invention may be understood I will proceed to describe the same with reference to the drawings accompanying this specification, in which:—

Figure 1 shows in vertical section the joint between the tone-arm and trumpet of a talking machine. Fig. 2 is a detail thereof. Fig. 3 shows a form of the invention in which the motion is universal; Fig. 4 shows elevation of a disk phonograph fitted with my improved tone arm; Fig. 5 shows elevation of one means of fitting my improved tone arm to a cylinder phonograph; Fig. 6 shows another form of my joint as being also suitable for a tone arm of talking machines; Fig. 7 shows a construction similar to Fig. 2 with the addition of lugs hereinafter referred to.

The same letters of reference are employed to denote the same parts in all the views.

$a$ is a pipe terminating in the usual trumpet. $b$ is an annular flange formed with or attached to the pipe $a$ and provided with a spherical concave surface $c$ forming the seating. $d$ is another pipe, which is provided with a flange $e$. This flange has a convex surface which is of similar spherical curvature to the surface $c$ of the flange $b$ and fits closely in contact therewith. The flange $e$ is provided at the back with two short grooves $g$ as shown in the plan of the back of this flange at Fig. 2 to prevent motion of the arm in the plane of the paper. $h$ is a ring furnished with an annular groove $i$, or it is obvious that I may have the annular groove $i$ on the under side of the flange $e$ and the two short grooves $g$ on the ring $h$. The ring $h$ may be attached to the flange $b$ by screwing or otherwise. $j$ are balls resting in the grooves $g$ and the annular groove $i$. It will be seen that by this arrangement the arm $d$ can have a motion of complete rotation given to it and every motion except one in the plane of the paper. In using this joint for disk or cylinder talking machines I may fix to such joint either a taper tubular arm or a parallel tubular arm or a tubular arm partially tapered and partially parallel, to form what is known in the trade as the tone arm.

Fig. 3 shows a form of the invention in which the motion is universal and not restricted in any direction. In this case, the construction is precisely similar to that shown in Fig. 1, but the surface $k$ at the back of the flange $e$ on the pipe $d$ is also spherical but without the grooves $g$ and concentric with the surfaces $b$ and $e$. It can be kept in position by the spherical surface of the ring $l$ (which has no groove $e$) or by other means and attached to the flange $b$ by means of screws or otherwise. If desired the side motion in the plane of the paper can also be prevented by fixing two lugs $s$ opposite to one another on the edge of the flange e as shown in Fig. 7.

m shows the bracket attached to the casing of the machine which I prefer to fit so as to be capable of horizontal adjustment as shown. This I may effect by having the arm portion n of the bracket m provided with a slot o through which two bolts p may pass provided with suitable nuts, so that this portion n can be adjusted nearer to or further from the case of the phonograph as may be found necessary.

With reference to Fig. 5 r shows a bracket fitted to or formed with the traverse carriage. To the upper end of this bracket r is fitted the ring h carrying the pipe or tone arm d, in the upper portion of which is fixed the trumpet as shown in Figs. 4 and 5.

What I claim and desire to secure by Letters Patent of the United States of America is:—

1. In a talking machine, the combination of a tone arm having a flange at its extreme end, a trumpet having a corresponding flange at its extreme end, and a cap extending from one flange around the end of the other flange and supporting it on the opposite side, but leaving an intermediate space for free movement, substantially as described.

2. In a talking machine, the combination of a tone arm having a convex annular flange at its extreme end, a trumpet having a similarly shaped, but concave, annular flange at its extreme end and adapted to fit over said first named flange, a cap fastened to and extending from one flange around the edge of the other flange and supporting it on the opposite side, but leaving an intermediate space for free movement, substantially as described.

3. In a talking machine, the combination of a tone arm having an annular convex flange at its extreme end, a trumpet having a similarly shaped but concave annular flange at its extreme end, and adapted to fit against said first named flange, a cap fastened to and extending from one of said flanges around the edge of the other flange and supporting it on the opposite side, but leaving an intermediate space for free motion, and anti-friction devices between said cap and one of said flanges, substantially as described.

In testimony whereof, I affix my signature, in presence of two witnesses.

ALEX FISCHER.

Witnesses:
A. BROWNE,
H. D. JAMESON.